Aug. 14, 1945.   W. WIDMANN   2,382,278
FILTER
Filed March 19, 1943
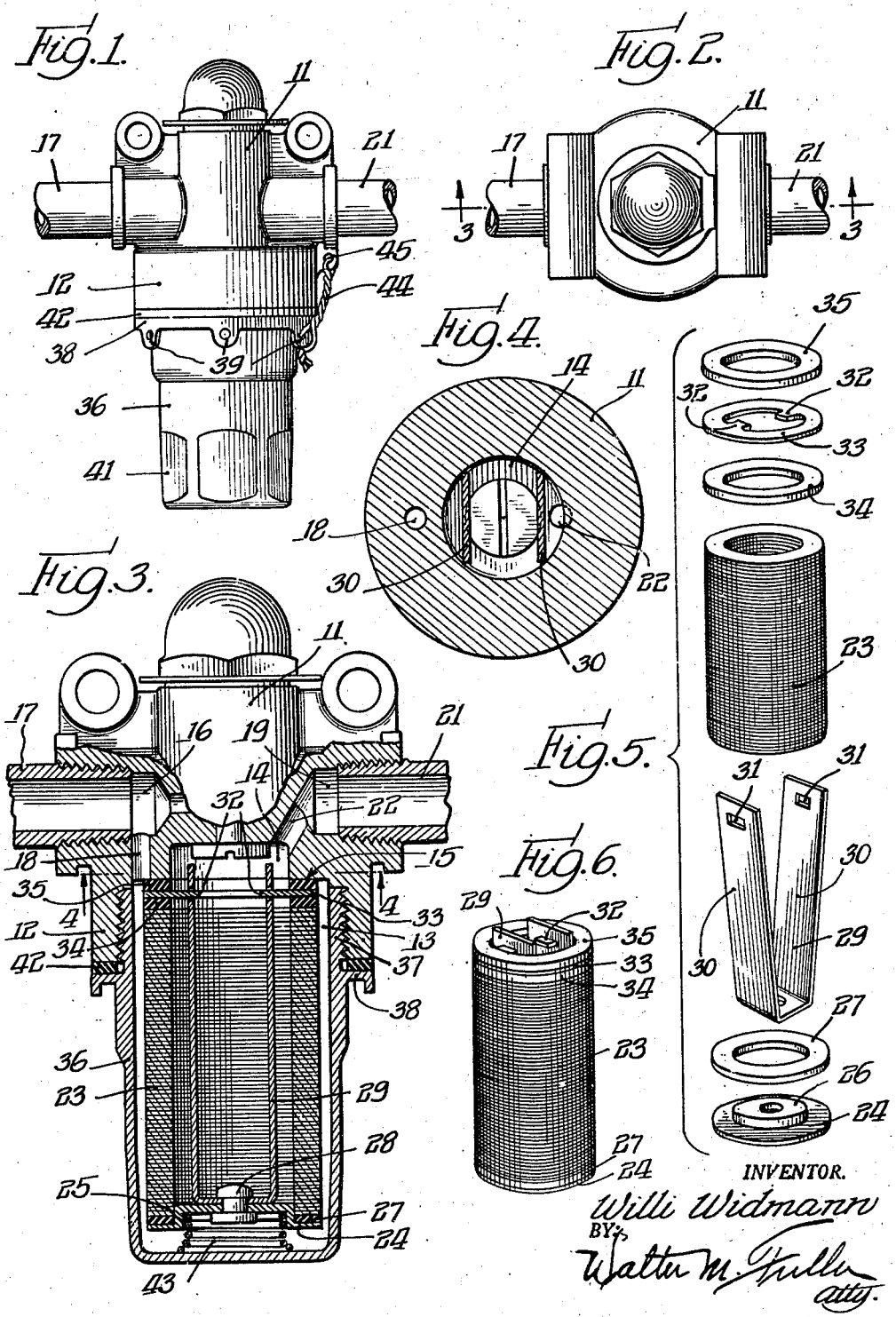
INVENTOR.
Willi Widmann
BY
Walter M. Fuller
atty.

Patented Aug. 14, 1945

2,382,278

UNITED STATES PATENT OFFICE 2,382,278

FILTER

Willi Widmann, Detroit, Mich., assignor to Ralph L. Skinner, Detroit, Mich.

Application March 19, 1943, Serial No. 479,730

4 Claims. (Cl. 210—164)

The present invention relates to certain features of betterment and advantage in filters and more particularly in those of the edge-filtration type, and it concerns especially the mounting of the filter-element incorporating the layers of material between which the filtering action takes place.

In order that those skilled in this art may readily understand the invention and the advantages accruing from its employment, a present, preferred, desirable embodiment of the invention, comprising a filter adapted to filter the anti-icing fluid of an airplane, has been illustrated in the accompanying drawing, forming a part of this specification, and to which reference should be had in connection with the following detailed description, and, for simplicity, the same parts of the structure, as shown in the several views, have been supplied with like reference numerals.

In this drawing:

Figure 1 is an elevation of the complete filter showing it connected to inlet and outlet pipes;

Figure 2 is a plan view of the structure presented in Figure 1;

Figure 3 is an enlarged view showing a portion only of the filter in central, vertical section;

Figure 4 is a horizontal section on line 4—4 of Figure 3 viewed looking upwardly;

Figure 5 illustrates the several parts of the filter-element in perspective and in separated relation; and Figure 6 is a perspective view of the complete filter-element.

By reference to this drawing, it will be seen that the upper part or head portion of the filter 11 has an internally screw-threaded depending wall 12 and above the chamber 13 defined by such wall there is a smaller cylindrical chamber 14 directly communicating therewith, the chamber 13 having a top, flat, annular shoulder or surface 15 surrounding the entrance to compartment 14.

A lateral inlet-passage 16 adapted to be connected to an entrance-pipe 17 is in communication with the outer portion of chamber 13 by reason of a short conduit 18.

On the other side of the filter-head, it has an outlet-passage 19 designed to be joined to a discharge-pipe 21, the delivery conduit 19 being connected to the upper portion of the smaller chamber 14 by a passage 22.

The filter-element comprises a series of registered, face-to-face contacting washer-shaped paper-discs 23, or in place of these separate discs the element may be composed of a spirally-wound relatively-narrow ribbon of paper, but in either instance such paper has a sufficiently uneven surface to provide the required edge-filtration property, the paper being impregnated or charged with a material or agent unaffected by the fluid to be filtered or by any of its contaminants, such agent preferably, but not necessarily, adhering the layers of paper together sufficiently to constitute a unit-structure, but without preventing the filtration of the fluid between their contacting faces.

The lower end of such filter-element is covered and closed by a metal end-member 24 having on its bottom face a central, cylindrical cavity 25 and on its upper face a corresponding, cylindrical, centrally-apertured boss 26 fitting snugly in the lower end of the pack 23, a neoprene or other appropriate ring washer or gasket 27 resting on the member 24, encircling the boss 26, and bearing against the annular underface of the hollow unit 23.

By means of a rivet 28, occupying the hole through the boss 26, the center part of a U-shaped metal spring, characterized as a whole 29, is fastened to the top of the end-member 24, as shown in Figure 3, the two upstanding arms 30, 30 of such resilient member normally tending to diverge somewhat as illustrated in Figure 5, the upper end portions of such upstanding, elastic members having registering apertures 31, 31 receiving the opposite, inwardly-directed lugs or projections 32, 32 of an apertured, metal disc 33 at the upper end of the filter-element between two, annular, neoprene gaskets 34 and 35, the former 34 being interposed between the uppermost paper surface of the filter-element and the disc, and the latter 35 being located between the upper surface of such disc and the shoulder 15 heretofore referred to, the extreme upper ends of the arms 30, 30 fitting in the small chamber 14 with their four corners engaging the wall of such chamber as presented in Figure 4.

A casing or shell, characterized as a whole 36, having an upper screw-threaded part 37, an intermediate circular flange 38 with spaced-apart marginal apertured ears 39, and an angular lower portion 41, is screwed into the chamber 13 with a suitable resilient gasket 42 between the flange 38 and the annular bottom surface of the wall 12 forming therewith a pressure-tight enclosure, a spring 43, fitting in part in the cavity 25 of the end-member 24 and bearing against the bottom wall of the casing or shell 36, pressing the filter-element upwardly and suitably maintaining it in proper operative relation.

The passage through the filter-element and the chamber 14 are of the same diameter and the opposite edges of the pair of arms 30, 30 engage the inner surfaces of such passage and chamber, as illustrated, thus maintaining the filter-element in proper, central, registered position.

To prevent the casing or shell 36 from becoming jarred loose, the main-body or head of the filter is provided with an apertured ear 45, and a locking-wire 44 extended through the hole thereof and through the aperture of the appropriate part 39 precludes unintentional loosening of the casing, but when the filter-element requires cleaning or replacement, such locking-wire 44 is untwisted, leaving the shell or casing free to be turned and this is removed from the head of main-body whereupon the filter-element may be taken out as a unit and cleaned and replaced.

If a new paper-pack is required, the old one is readily released by squeezing the arms 30, 30 of the member 29 toward one another freeing them from the lugs 32, 32, whereupon the end-member 24 and its attached parts may be withdrawn from the element and used with a new one and then all of the parts put together as illustrated.

This filter, as stated, is particularly adapted for filtering anti-icing fluid used in connection with airplanes, or for filtering gasolene, or for other purposes, and when in operation the fluid to be filtered flows through the connecting passages 17, 16 and 18 into chamber 13, then through the shallow spaces between the layers of impregnated-paper into the interior of the filter-element from which it flows upwardly into chamber 14 and then out through the connected conduits 22, 19 and 21, all as will be readily understood.

It is to be noted that the invention, as defined by the appended claims, is not necessarily limited and restricted to the precise and exact details of structure illustrated and described and that various modifications may be resorted to without departure from the heart and essence of the invention as set forth in the appended claims and without the loss or sacrifice of any of the material benefits or advantages accruing from the employment of the invention.

I claim:

1. In an edge-wise filtration filter-element of known type having a series of registered face-to-face contacting layers of an uneven-surface material substantially unaffected by the fluid to be filtered or by any of its contaminants and unitedly surrounding an internal passage through the series, a closure for one end of such passage, and a member in said passage and secured to said closure, the novel improvement being that said member has a pair of apertured resilient arms with a tendency to diverge laterally of said filter-element, in combination with an apertured disc having a pair of lugs extended inwardly of said disc aperture and fitting in the apertures of said arms, said disc bearing against the opposite end of said series of layers.

2. The novel improvement in a filter-element set forth in claim 1 in which said filter-element passage is cylindrical, in which two opposite edges of each of said arms engage the wall of said passage, and in which the tendency of said arms to diverge holds the edges of said arms in engagement with the wall of said passage.

3. In a filter of known type having a hollow body with an inlet and outlet, a casing demountably secured to and depending from said body and forming an enclosure therewith, an edge-filtration filter-element in said enclosure and operative between said inlet and outlet, said filter-element having a series of registered face-to-face contacting layers of an uneven-surface material substantially unaffected by the fluid to be filtered or by any of its contaminants and unitedly surrounding an internal passage through the series, a closure for one end of such passage, an apertured disc at the opposite end of said passage with its aperture in communication with said passage, and a member in said passage and secured to said closure, the novel combination of features being (a) that said member has a pair of resilient arms tending to separate, (b) that said disc has an interlocking engagement with the arms of said member, (c) that said body has a chamber in register with the passage through said filter-element, (d) that said arms extend beyond said disc into said chamber, and (e) that two opposite edges of each said arms engage the wall of said filter-element passage and engage the wall of said chamber, thereby centering the filter-element with respect to said chamber.

4. The novel combination set forth in claim 3 in which said resilient arms are apertured and in which the interlocking engagement includes inwardly directed lugs on said disc fitted in the apertures of said arms.

WILLI WIDMANN.